United States Patent [19]

Ardenti

[11] Patent Number: 4,796,755
[45] Date of Patent: Jan. 10, 1989

[54] MEANS AND METHOD OF PROTECTING DATA STORED ON OPTICAL OR MAGNETIC MEDIA OF VARIOUS SIZES AND SHAPES

[76] Inventor: Angelo M. Ardenti, 10123 Woodbury Dr. Apt. 312, Manassas, Va. 22110

[21] Appl. No.: 10,531

[22] Filed: Feb. 3, 1987

[51] Int. Cl.⁴ .............................................. B65D 85/57
[52] U.S. Cl. ................................. 206/444; 206/387; 206/328; 206/309; 206/334
[58] Field of Search ............... 206/444, 334, 328, 387, 206/454, 561, 309

[56] References Cited

U.S. PATENT DOCUMENTS

| | | | |
|---|---|---|---|
| 4,101,027 | 7/1978 | Kohl et al. | 206/387 |
| 4,238,030 | 12/1980 | Maylandt | 206/444 |
| 4,293,070 | 10/1981 | Ohlbach | 206/328 |
| 4,712,679 | 12/1987 | Lowe | 206/444 |
| 4,718,552 | 1/1988 | Rossi et al. | 206/444 |

Primary Examiner—Joseph M. Moy
Attorney, Agent, or Firm—Terry M. Gernstein

[57] ABSTRACT

A system for protecting magnetic or optical media stored therein includes a disposable holder that is sized and arranged to accommodate the magnetic or optical media receptacles used with a particular data and record storage system. The holder can be changed to accommodate various sizes and shapes of such receptacles. The holder is removably received in a container which is also removably received in a shield. The shield protects the media from x-rays, magnetic fields, etc, and is received in a carrying case. The carrying case, the container and the shield are sized according to the longest magnetic or optical media receptacle to be contained in the system, and the holder is changed as necessary. A method of storing and protecting business records and data is also disclosed.

32 Claims, 6 Drawing Sheets

MEANS AND METHOD OF PROTECTING DATA STORED ON OPTICAL OR MAGNETIC MEDIA OF VARIOUS SIZES AND SHAPES

TECHNICAL FIELD

This invention relates in general to a means and method for protecting business records. In particular, the invention is directed to protecting such records stored on optical or magnetic media. Specifically, the invention is directed to storing and transporting media which is stored in receptacles of various sizes and shapes.

BACKGROUND OF THE INVENTION

In recent years, optical and magnetic media has become increasingly popular as a means for storing information, such as the business and financial records of a company. As the popularity of these methods of storing information increases, the variety of such media also increases as more and more companies seek to enter the market with their own information storage systems. For example, media is now available in magnetic tape format, as well as in an optical disc format, and there are variations within these formats.

The variety of optical and magnetic media available has created problems in that individual storage receptacles for the various media are made for the specific media to be stored therein and thus are of different sizes and shapes to correspond to the different sizes and shapes of the various type media available. Therefore, one storage container is useful for only one shape or size of specific media. In fact, the storage devices presently on the market are generally only suitable for one or two close sizes of a particular shaped media. For example, a single storage device may be suitable for the regular polyhedral shapes, but be sized to accommodate IBM size magnetic media only, or the magnetic media produced by another company, only. Furthermore, such storage devices will not be able to accommodate media such as an optical disc which has a size considerably larger than the just-mentioned magnetic media. These storage devices are also not suitabale for use in conjunction with circular shapes, such as magnetic tapes, or the like.

Accordingly, many companies are subjected to significant costs in obtaining transport and storage devices for their media, and then may be subject to additional equally significant costs if they alter their media.

This problem is not significant if the media is to be stored in inexpensive containers, such as cardboard boxes, or the like. However, magnetic and optical media is sensitive to x-rays, magnetic fields, moisture, impact and the like. Such inexpensive storage devices do not adequately protect optical or magnetic media against such factors. Accordingly, the storage containers for optical and magnetic media may be costly enough to represent an important factor to be considered when a company is trying to decide what data storage system to use, and/or whether or not to change an existing data storage system.

In recent years also, many companies have stored so much of the company records on optical or magnetic media that destruction of such media would be disastrous. One way to protect against such event is to prepare an archival set of records. However, this is not fully protective as the archives can also be destroyed by a single event, such as fire or the like. Furthermore, the use of an archive presents the above-discussed problem of providing proper, and potentially expensive, storage devices. In fact, additional problems are raised if the archives are located at a site which is different from the central processing site as shipping may subject the media to impact, magnetic destruction and mishandling, thereby exacerbating the above-mentioned problems associated with storage devices. Furthermore, any problems with inserting the media into a storage device are also worsened by such archival method as shipping and handling costs and problems increase as well as the possibility of damage due to mishandling.

Therefore, there is a need for a means and a method of permitting a company to provide as much protection to its records as possible in a manner which is both inexpensive and easily adaptable to a variety of media sizes and shapes.

DESCRIPTION OF THE INVENTION

The main object of the present invention is to provide a storage and transport system which is easily adapted to accept a wide variety of optical and magnetic media storage receptacle shapes and sizes. In this manner, a company need only purchase one such system even though its records and data is, or may be, on various sizes and shapes of media, such as an optical disc, magnetic tape or the like.

Another object of the present invention is to provide a storage and transport system which can also be formed to protect the stored media against a wide variety of factors such as x-rays, magnetic fields, moisture, impact, fire and the like. Since the system is easily and inexpensively adaptable to a wide variety of optical and magnetic media, the system's initial purchase price is less of a factor than is present in heretofore known devices. Therefore, the added expense of providing additional protection is not as significant in the present system as it is in prior art devices.

Another object of the present invention is to provide an optical or magnetic media storage and transport system which is easily stored, stackable and mailable, yet still fully protects the media contained therein.

Another object of the present invention is to provide a storage and transport system that is adaptable to a wide variety of media and is relatively inexpensive so that it is amenable to archival uses. Thus, a company can easily store or archive its business records in several systems, and ship the systems to one or a variety of sites without significantly increasing the costs associated with the data storage system. This permits the company to dispose of its records as it deems necessary, store some of its records on one set of media and to store those records at one site, store other records on another set of media which can be of different size and shape, and store those other records at yet another site and so forth. This will improve the capability of the company to establish continuity of its operations in the event of a disaster, either man-made or natural. This will permit a company to fully protect its records and data without adding undue costs. Since the system of the present invention fully protects the media, it can be shipped to one or a wide variety of sites thereby creating a wide variety of storage, transport or archive possibilities.

These and other objects are accomplished by the present invention which provides a storage and transporting system for optical or magnetic media which includes a monolithic, disposable holder, a container sized to removably receive the holder, a shield for removably receiving the container and a carrying case. The container is sized to accommodate a holder that, itself, is sized to have a length dimension equal to, but just slightly greater than, the length-type dimension of the largest media to be contained in the system. The holder is formed of an inexpensive, easily formed material and can be easily and inexpensively changed to accommodate different media receptacles; however, the remaining members of the system are sized according to the size of such "large-receptacle" holder and thus need not be changed to accommodate various smaller sized media. Only the expensive holder needs to be changed if the optical or magnetic media size and/or shape is changed.

For example, if an optical disc is the media having the greatest "length" dimension to be accommodated in the system, the "large-media" holder will be sized to have a length dimension essentially equal to, but just slightly greater than, the "length" dimension of the optical disc whereby an optical disc can be placed lengthwise in the holder, and several such discs can be accommodated across the width dimension of the holder. Since the holder establishes the size of the rest of the system, any other size or shape of media can be easily accommodated in the system by merely changing holders. This avoids the need to change systems each time a new size or shape of media is to be used, and, instead, only requires the purchase of new holders. The Phillips optical disc is an example of an optical disc to which the present storage and transport system is amenable. The Phillips optical disc has a size of about 13⅛ inches by 13 inches by 1 inch. Therefore, the "largest-holder" will have a length dimension of essentially equal to, but slightly greater than 13⅛ inches, and the container and the remainder of the system is sized according to such "large" holder. Other sized and shaped media receptacles are easily accommodated in the system thus sized by merely changing the inexpensive holders accordingly.

Using the storage and transport system of the present invention, a company can have all its records and data at a central location, and, for example, have financial records in storage at archives at another location, personnel records in yet another location, research records at still another location, and so forth. The company can also have all of its records at a central processing location, and, if those records are destroyed, the company merely has to retrieve such records from the various storage or archive site or sites. The adaptability of the storage and transport system of the present invention makes such method of saving records and data economically feasible.

DETAILED DESCRIPTION

Figure 1:
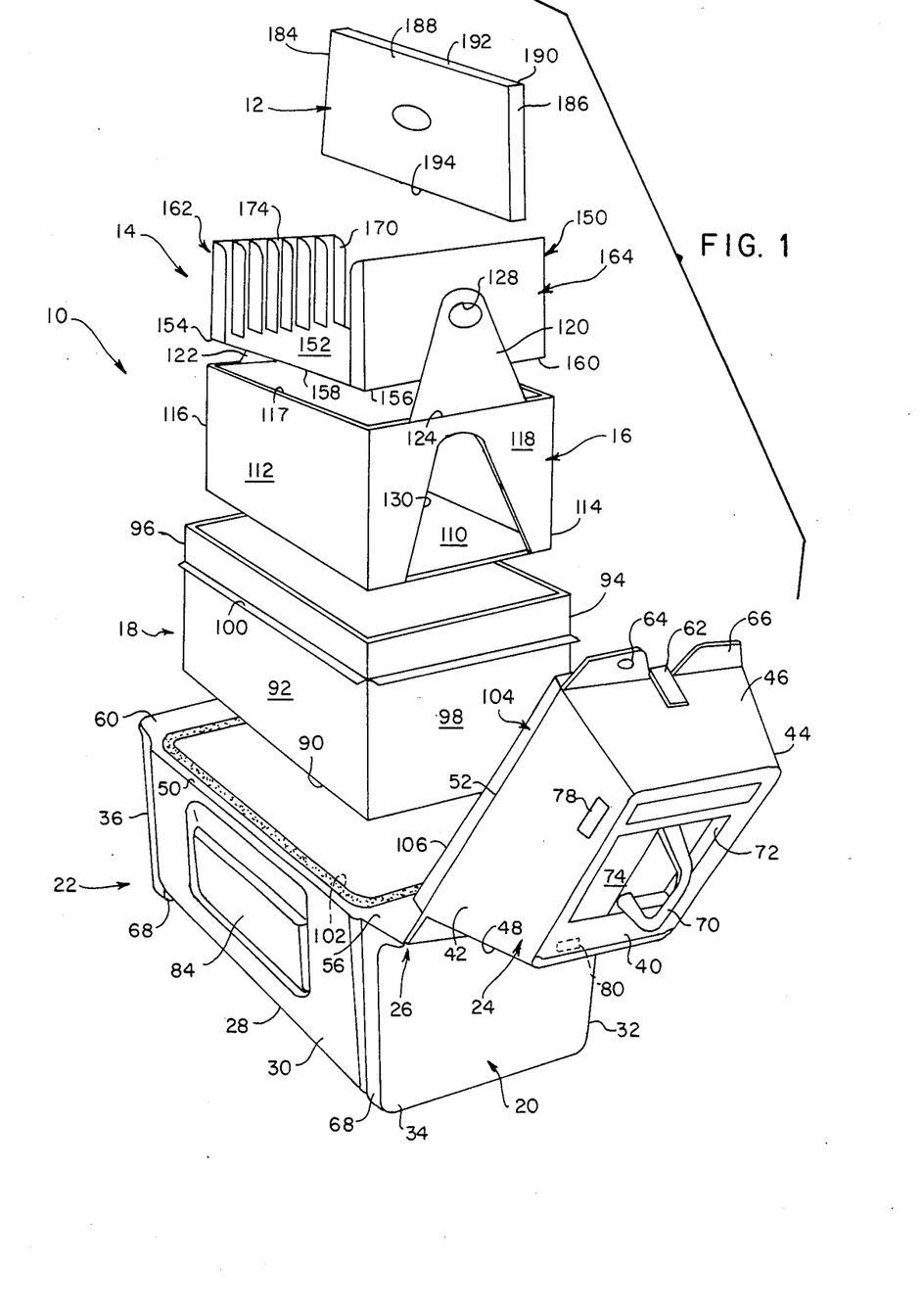
FIG. 1 is an exploded perspective of the media storage and transport system embodying the present invention.

Shown in FIG. 1 is a storage and transport system 10 for storing and/or transporting magnetic or optical media 12. The system 10 includes an insert or holder 14 for removably receiving the media 12, and which, itself, is removably received in a container 16. The container 16 is removably received in a shield means 18 positioned in a bottom section 20 of a carrying case 22. The carrying case 22 includes a top section 24 attached to the bottom section by a hinge 26 which can be either a living hinge or an anti-magnetic metal hinge.

The carrying case bottom section 20 includes a bottom 28, front and rear sides 30 and 32 and ends 34 and 36 which cooperate to define an open-topped carrying case bottom compartment. The carrying case top section 24 includes a top 40 front and rear sides 42 and 44, and ends 46 and 48 which cooperate to define a top section compartment. A shoulder section 50 surrounds the periphery of the carrying case bottom section and cooperates with a corresponding shoulder section 52 on the periphery of the carrying case top section to securely close the carrying case. The hinge 26 is located on one end flange 56 and a lock portion is mounted on another end flange 60 to cooperate with a lock latch 62 mounted on the carrying case top section. A hole 64 can be defined in flange 66 for receiving a shackle of a lock if desired to further lock the carrying case. Stacking shoulders 68 are located on the ends 34 and 36 so a plurality of carrying cases can be stacked for storage or transport.

The carrying case further includes a carrying handle 70, which can be plastic or anti-magnetic metal, positioned within the periphery of a stacking fence 72 located on the carrying case top 40 and is pivotally attached to the carrying case top to assume the upright configuration shown in FIG. 1 or a stored configuration which is ninety degrees from that upright orientation. Identifying indicia, which can include mailing instructions and the like, is contained in a holder 74, and special codes, such as UDC bar code or the like, can be located in a special holder 78 on the carrying case top. A desiccant holder 80 is mounted on the carrying case top to be located inside when the carrying case is closed. Further indicia can be mounted on the carrying case in holder 84.

Figure 2:
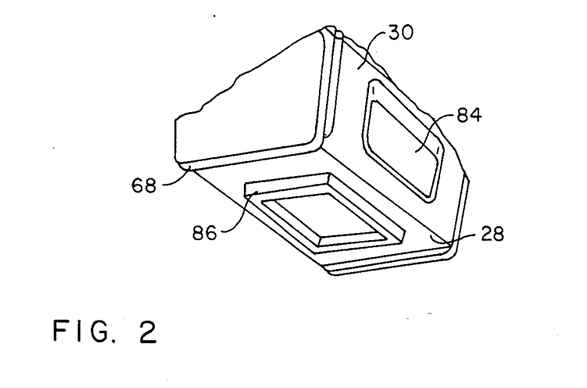
FIG. 2 is a perspective of the bottom of a carrying case of the present invention.

A bottom stacking fence 86 (see FIG. 2) is located on the bottom 28 of the carrying case bottom section to cooperate with the top stacking fence 72 to form an interlock for adding stability to a stacked configuration of a plurality of carrying cases.

The carrying case is preferably formed of plastic material which is both rugged and lightweight. The material of the carrying case should be fire-retardant, moisture resistant, impact resistant and adapted to form a dust-tight or watertight seal when the carrying case is closed. Preferably, the carrying case is single molded, and the portions thereof adjacent to the hinge 26 are reinforced on the interior surfaces of the compartments to provide long-term strength against breakage.

The shield means 18 includes a bottom 90, sides 92 and 94 and ends 96 and 98, all of which cooperate to form an open-topped configuration into which the container 16 is removably received. The shield means includes a peripheral flange 100 extending out from the sides and ends. The peripheral flange 100 rests on a shoulder 102 defined in shoulder 50 of the carrying case to define a seal against moisture, dust and the like. A further shield means 104 is positioned in the top section 24 and includes a top, sides and ends which cooperate to define an open configuration. The further shield means 104 in the carrying case top is slightly larger than the shield means 18 in the carrying case bottom whereby the shield means 18 is receivable in the further shield means 104 to define an overlapping joint adjacent to the shoulder 50 when the carrying case is closed. In this manner, the shield means 18 and the further shield means 104 form a closed container about the contents of the carrying case when that carrying case is closed. The peripheral edge 106 of the further shield means rests on the flange 100.

The shield means 18 and the further shield means 104 are made of material which will prevent magnetic fields, x-rays and the like from penetrating therethrough. Therefore, these shield means protect any media stored in the carrying case. Preferably, the shield means are formed from metal such as iron and can be plated with materials, such as nickel or the like. The metal should be as thin as possible to keep costs and weight as low as possible. One possible material is AD-MU-OO, which has a chemical analysis of: Carbon (0.40); Iron (99.633); Manganese (0.300); Phosphorus (0.008); and Sulphur (0.019). It is noted that the foregoing materials are intended to be examples, and are not intended to be limiting to the invention.

The container 16 includes a bottom 110, sides 112 and 114, and ends 116 and 118. The container sides and ends define a peripheral rim 117, and a pair of handles 120 and 122 are attached by living hinges, such as living hinge 124, to the top rim 117 at the ends of the container. The handles have finger holes 128 defined therein and are adapted to be rotated from the upright position shown in FIG. 1 at least ninety degrees to a horizontal position overlying the container so that they can be folded into the carrying case. The handles 120 and 122 are used to lift the container 16 into and out of the shield means 18. Each end 116 and 118 of the container also has a cutout, such as cutout 130 defined therein. The cutouts are shaped to correspond to the shape of the handles 120 and 122 and receive the handles of a subadjacent container when two or more containers are in a stacked configuration.

The container 16 is formed of lightweight plastic material, and fits inside of the shield means.

The holder 14 is received within the container and selectively receives and securely supports a multiplicity of individual magnetic or optical media receptacles in at least one arranged row.

Figure 3:
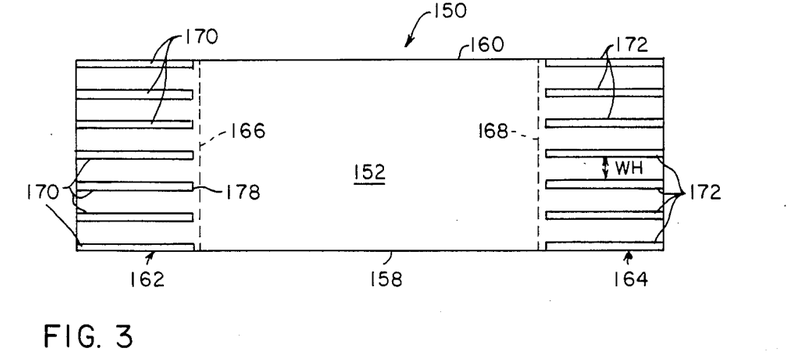
FIG. 3 is a top plan view of a media holder of the present invention.
Figure 4:
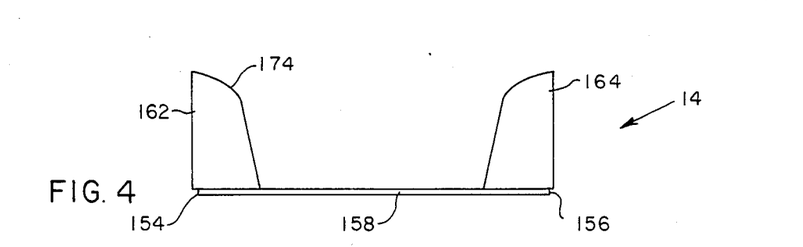
FIG. 4 is an elevation view of the FIG. 3 holder in a set-up configuration.

The holder 14 is best shown in FIGS. 3 and 4, and includes a monolithic disposable element 150 having a base 152, which includes ends 154 and 156 and sides 158 and 160. End flaps 162 and 164 are connected to the base 152 by hinges 166 and 168, which are living hinges so that the end flaps are adapted to be rotated from the position shown in FIG. 3 coplanar with the base, ninety degrees into the position shown in FIG. 4 which is essentially upright with respect to the base. The set-up position of the holder shown in FIG. 4 is a U-shape. Each end flap 162 and 164 includes a plurality of track defining elements such as elements 170 and 172 which are positioned to cooperate with each other to define a plurality of media receptacle receiving tracks for securely supporting media receptacles on the holder. The area of base 152 between the track defining elements is open and essentially unobstructed so the receptacles can be easily maneuvered into and out of the tracks. The track defining elements have a slightly curved top surface 174 which acts as an entranceway for the receptacles to further ease the insertion and removal of the receptacles to and from the holder tracks. The track defining elements are essentially flat on the bottoms 178 to abut the base 152 so the tracks are securely supported in the FIG. 4 upright orientation.

For purposes of the ensuing discussion, the magnetic or optical media 12 will be referred to as a media receptacle, and has a length dimension extending between ends 184 and 186, a thickness dimension extending between faces 188 and 190, and a height dimension extending between top 192 and bottom 194.

Figure 5:
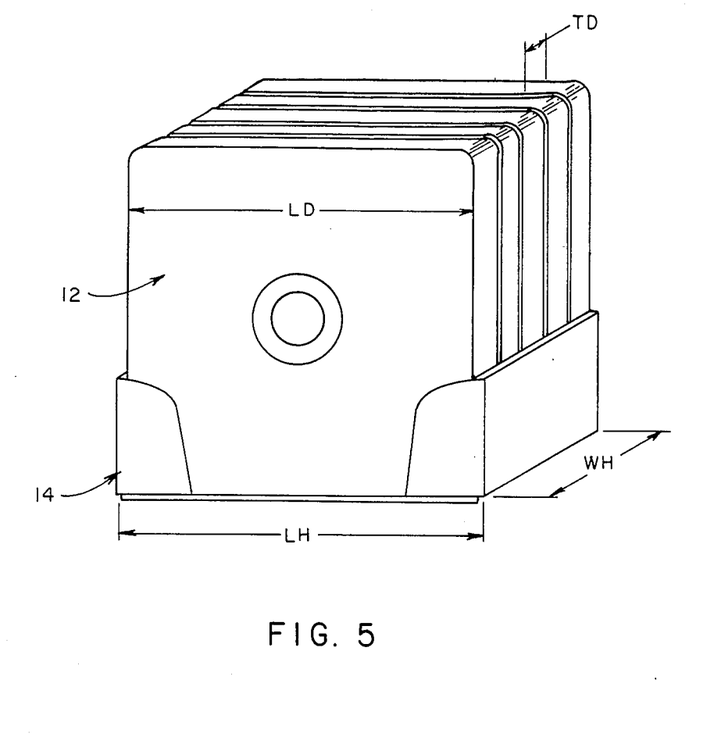
FIG. 5 is a perspective view of a set-up holder accommodating the "longest" magnetic media to be contained in the system.

The holder 14 is sized to have a length as measured between the ends 154 and 156 thereof which is essentially equal to, but just slightly greater than the length of the longest media receptacle 12 to be stored therein so that the longest media receptacle is receivable in the holder and has the ends 184 and 186 thereof in abutting contact with the holder end flap surfaces located between the track forming elements 170 and 172 so those track forming elements abut the media receptacle faces 188 and 190 to securely hold the receptacles in place on the holder. As can be seen, the width dimension of the holder 14 is substantially larger than the thickness dimension of the receptacles whereby a plurality of receptacles can be stored on the holder in a row configuration across the width of the holder as best shown in FIG. 5.

As above discussed, the length dimension of the holder is set according to the longest media receptacle to be contained in the system 10. For example, if the longest receptacle is to contain an optical disc, such as the aforementioned Phillips Optical disc that has a "long" dimension of 13⅜ inches, such as shown in FIG. 5, the holder is sized to accommodate a plurality of such optical disc receptacles in the configuration as shown in FIG. 5. Since the container 16 is sized according to the size of the holder, and the remaining elements of the system 10 are sized according to the size of the holder and the container, the sizes of the remaining elements of the system 10 are set to accommodate the longest receptacle. In this manner, any other receptacle is easily accommodated in the system since the system will be "bigger" than any such other receptacle.

However, to avoid damaging the receptacles or the media contained therein during storage and/or transport, the system elements should be sized to snugly hold the receptacles contained therein at all times. Therefore, the system must be modified to accommodate the smaller receptacles.

Since the holder is formed with an object of carrying out its function while being inexpensive, while the carrying case and the shield means are formed with the main object being to protect the optical and/or magnetic media contained therein, these elements of the system should not be altered to accommodate media receptacles smaller than the longest receptacle.

However, the holder 14 is formed of disposable material, such as a lightweight moldable plastic type material. Therefore, the system is modified to accommodate smaller receptacles by changing the inexpensive holder accordingly.

Figure 6:
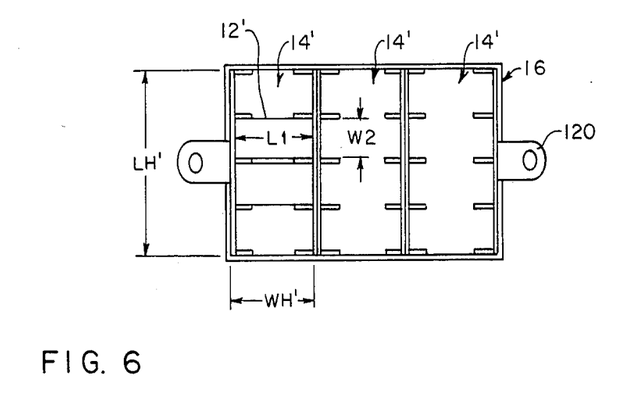
FIG. 6 is a top plan view of container with a holder accommodated therein.
Figure 7:
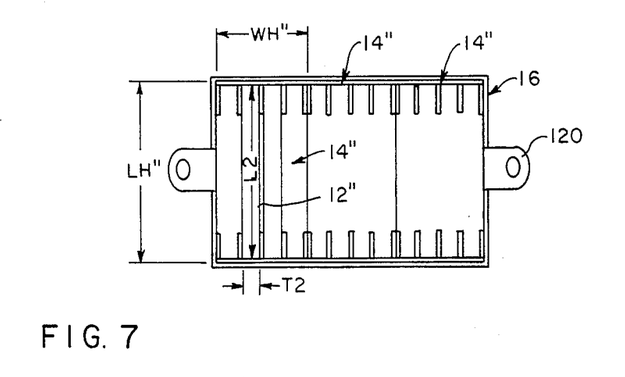
FIG. 7 is a top plan view of a container with another form of the holder accommodated therein.

For example, if the holder 14 shown in FIG. 5 has a length dimension LH and a track width dimension WH for the tracks 170 and 172 as shown in FIG. 3 which are both set to accommodate the longest receptacle 12 which has a length LD and a thickness TD, it will not accommodate a plurality of receptacles 12' shown in FIG. 6 each of which has a length L1 and a thickness W2, or a plurality of receptacles 12" shown in FIG. 7 each of which has a length L2 and a thickness T2. While the width dimension, WH, of the holder is sufficient to accomplish the purpose, the track width and the length of the holder are not proper.

Accordingly, additional holders 14' and 14" are used for receptacles 12' and 12" respectively, as shown in FIGS. 6 and 7 respectively. The holders 14' and 14" are similar in shape and construction to the holder 14, but have lengths LH' and LH" and track widths WH' and WH" respectively set to accommodate the receptacles 12' and 12" respectively. All of the holders 14, 14' and 14" are removably received in a container 16 having the same overall dimensions which are set according to holder 14, but the different holders are arranged within the container 16 differently and in different numbers as shown in FIGS. 1, 6 and 7. Since the holders are easily and inexpensively manufactured, they can be easily and inexpensively changed to account for changes in receptacle shape and size while maintaining the sizes and shapes of the remaining system elements the same whereby these system elements need not be repurchased every time a media receptacle size and/or shape is changed.

Figure 8:
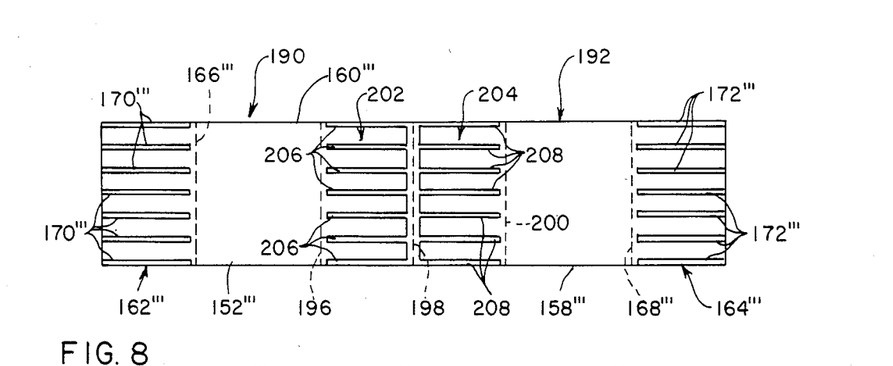
FIG. 8 is a top plan view of another form of the holder used in the system of the present invention.
Figure 9:
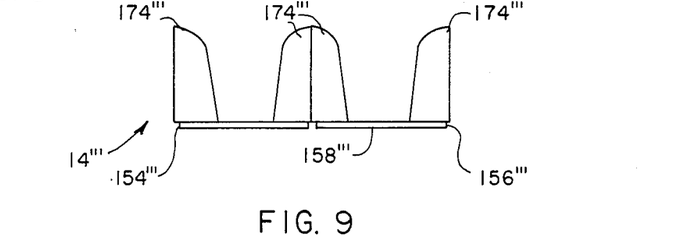
FIG. 9 is an elevation view of the FIG. 8 holder in the set-up configuration.

The holder can be manufactured in a variety of ways as well. Thus, while a single U-shape is shown in FIGS. 1, 6 and 7, the holder can also be manufactured to have a plurality of U-shaped sections. Thus, as shown in FIGS. 8 and 9, a holder 14''' includes a monolithic disposable element having a base 152''' divided into two sections 190 and 192. The base 152''' has ends 154''' and 156''' and sides 158''' and 160''' and living hinges 166''' and 168''' at those ends. The living hinges 166''' and 168''' connect end flaps 162''' and 164''' to the base at the ends of that base and there are track defining elements 170''' and 172''' on these end flaps. However, the holder 14''' also includes three additional living hinges 196, 198 and 200 located between the hinges 166''' and 168''' to define two additional flap elements 202 and 204. The additional flap elements 202 and 204 have track defining elements 206 and 208 thereon. When all of the flaps are set up by rotating them about their respective living hinges, the holder 14''' assumes the set-up configuration shown in FIG. 9 and has two side-by-side U-shaped compartments for containing two rows of receptacles in end-to-end arrangements. For this purpose, all of the track defining elements of the holder 14''' are arranged as shown in FIG. 8 to cooperate with each other to define tracks that are aligned in end-to-end arrangements. As shown in FIG. 9, the track defining elements of the holder 14''' have curved top edges 174''' and bottom edges that abut the base 152''' in a manner similar to the track defining elements of the holder 14. As is also shown in the Figures, all of the flap elements are of the same height in the set-up configuration. This height is preferably less than the depth of the container 16 as measured from the container top rim 117 to the bottom 110 of that container whereby the holder can be located within the container. The holder height only has to be sufficient to hold the receptacles securely. While the holders have been disclosed as including one or two sections, it is understood that they could have as many sections as desired, and the disclosure hereinabove is not intended to be limiting.

Figure 10:
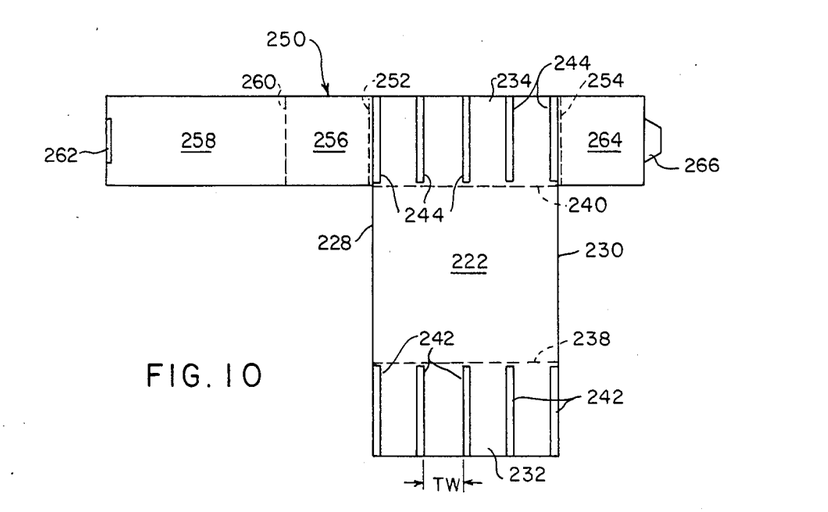
FIG. 10 is a top plan view of a holder for circular magnetic media receptacles.
Figure 11:
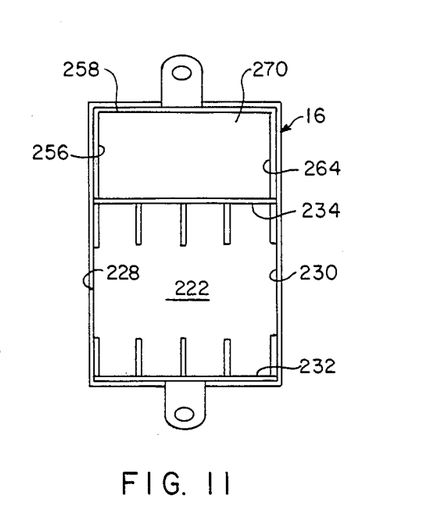
FIG. 11 is an elevation view of the FIG. 10 holder in a set-up configuration and positioned in a container.
Figure 12:
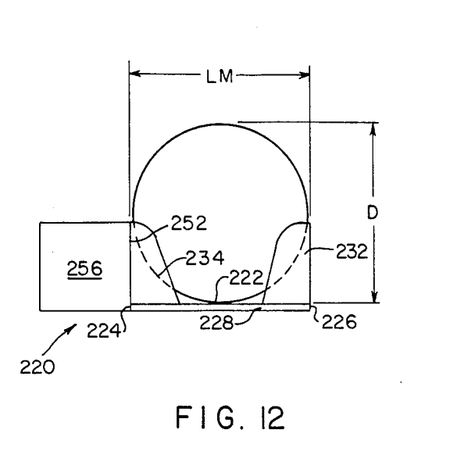
FIG. 12 is an end view of the FIG. 10 holder in a set-up configuration.

The holders 14–14''' are suitable for receptacles having a shape of a regular polyhedra with rectangular surfaces. However, some media is available in a form that requires a circular receptacle. Such media is also easily accommodated in the system 10 by merely using a proper holder. Such a holder is shown in FIGS. 10, 11 and 12 as holder 220. The holder 220 is also formed of a monolithic disposable element and includes a base 222 having ends 224 and 226 and sides 228 and 230. End flaps 232 and 234 are attached to the base at the ends thereof by living hinges 238 and 240 to be rotated from the FIG. 10 position coplanar with the base into the FIG. 12 position upright with respect to the base. Each of the end flaps 232 and 234 has track defining elements 242 and 244, respectively, thereon, and these track defining elements are similar in structure and operation to the previously-discussed track defining elements.

The length of the holder 220 is defined according to the diameter D of the circular media receptacle to be accommodated therein and, as above discussed, one system, which is sized and designed to accommodate a receptacle having the size and shape of the receptacle shown in FIG. 5 will be able to accommodate all sizes of circular receptacles as well by simply changing the holders in accordance with the principles discussed above. The track width TW of the holder 220 is set in accordance with the above-discussed principles as well. The length of the holder 220 can be equal to but just slightly greater than the diameter D of the circular receptacle, or it can be set according to a chord or secant of that receptacle as necessary to securely hold the receptacle in the holder.

The holder 220 also includes a filler means 250 attached to the end flap 234 by living hinges 252 and 254. The filler means includes a first flap 256 connected to the end flap 234 by the hinge 252 to be rotated from the position shown in FIG. 10 which is essentially coplanar with the end flap 234 ninety degrees into the position shown in FIG. 12 which is essentially perpendicular to the end flap 234. The filler means 250 also includes a second flap 258 attached to the first flap 256 by a living hinge 260 to be rotated from the position shown in FIG. 10 ninety degrees into the position shown in FIG. 12 which is essentially perpendicular to the first flap 256. The second flap 258 also has a slot 262 on an end thereof opposite to the living hinge 260.

The filler means also includes a third flap 264 attached to the end flap 234 by the living hinge 254 to be rotated from essentially coplanar with the flap 234 as shown in FIG. 10 ninety degrees into the position shown therefor in FIG. 12 approximately perpendicular to the end flap 234. The flap 264 also has a tab 266 on the end thereof opposite to the hinge 254. The tab 266 is positioned to be inserted into the slot 262 to attach the flap 264 to the flap 258 and thus form the set-up filler means as shown in FIGS. 11 and 12. As shown in FIG. 11, the filler means abuts the inside surface of the container 16 and maintains the holder in position in that container. The area 270 bounded by the filler means can be used to store papers, or the like.

Figure 13:
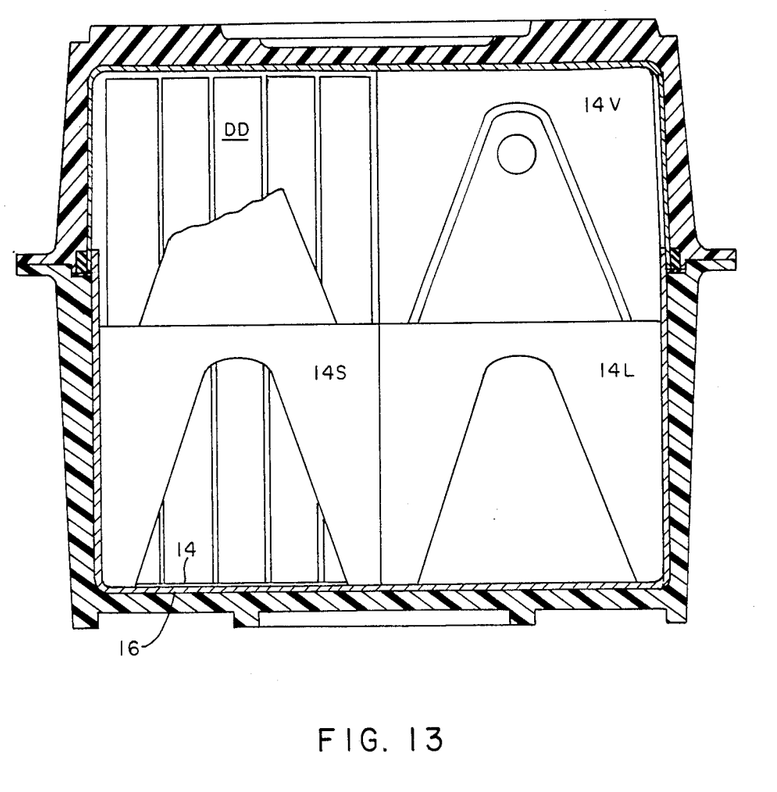
FIG. 13 is a cutaway elevation view of another form of the carrying case used in the system of the present invention.

As shown in FIG. 13, the carrying case need not be sized to accommodate only one container, but can be sized to accommodate a plurality of containers. These containers can be stacked as shown for containers 16U and 16L, or can be positioned side-by-side as shown for containers 16U, 16L and 16S whereby a large variety of receptacles can be stored in the carrying case by the simple expedient of changing the holders as necessary. The width and length dimensions of the various holders can be arranged to accommodate the various containers lengthwise (per FIGS. 5, 6, and 12) or widthwise (per FIG. 7) whereby the variations of receptacles can be increased. However, the individual containers are still sized according to the above-discussed considerations. That is, each individual container is sized according to the largest receptacle to be accommodated therein. Thus, all of the containers 16U, 16L and 16S are the same size according to the size of the optical disc DD shown in container 16S.

Figure 14:
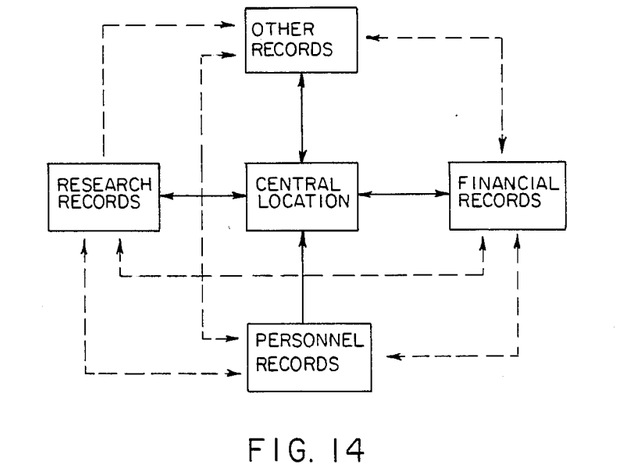
FIG. 14 is a schematic representing a method of protecting business records and data.

Using the system 10, a company can store its business records and data at a plurality of sites to diminish the potential of losing all of those records and data due to a single disaster, such as a fire or the like. A method of storing and protecting such records and data is indicated schematically in FIG. 14. In such method, the company produces two identical sets of records and data, and places one set on a first plurality of magnetic or optical media and the other set on another plurality of magnetic or optical media. The first plurality of media is used as the stored or archival records and the second plurality of media is used as the working records. Thus, the second plurality of media are retained at a location convenient to the computers and the necessary personnel. However, the first plurality of media is placed in a plurality of systems 10 and shipped to various sites for storage. The sites can be physically near each other, or separated by wide distances as necessary. The sites are chosen according to need, such as, for example, secret data and records can located in a site set up to store such records and data, while other records and data can be sent to other sites. As indicated in FIG. 14, the data and records can be shipped and transferred between the sites and the central location or between the sites themselves. In fact, the records and data can be rotated on a regular or irregular basis to further protect these data and records by maintaining the secret information in an irregularly scheduled movement loop whereby its location at any one time is not fixed.

While the schematic in FIG. 14 shows Research, Financial and Personnel records, other data such as stock inventory and the like can also be included in the method.

Each system used in the method is modified and adjusted according to the above disclosure whereby the method of storing and transporting business records and data is economically feasible while the magnetic media is fully protected as above discussed.

While the invention has been disclosed in a particular manner, such disclosure is not intended to be limiting, and any variations occurring to those skilled in the art based on this disclosure are intended to be covered as well by the claims appended hereto.

I claim:

1. A magnetic or optical media transporting and storing system adapted to selectively receive magnetic or optical media of various sizes and shapes comprising:
   (A) a holder adapted to selectively receive and securely support a multiplicity of individual magnetic or optical media receptacles in at least one arranged row, said holder including
      (1) a monolithic disposable element which includes a base having ends and sides and a length as measured between said ends which is essentially equal to but just slightly greater than the longest media receptacle to be carried in said holder, and a width as measured between said sides which substantially exceeds the thickness of any media receptacle to be carried in said holder,
      (2) a hinge on each of said base ends,
      (3) an end flap connected to each of said hinges to be movable into a position which is substantially upright with respect to said element base to define a U-shape for said disposable element,
      (4) a plurality of end flap track forming elements positioned on each of said end flaps with track defining elements in one of said end flaps cooperating with track defining elements in the other of said end flaps to define a plurality of media receptacle receiving tracks for securely supporting said media receptacles on said disposable element;
   (B) a container for accommodating said holder, said container including a container bottom and container sides and ends which are attached to said container bottom to form an open-topped configuration, said container being sized so that said holder is removably receivable and securely held in said container;
   (C) a shield means having a bottom, sides and ends which cooperate to form an open-topped configuration, said shield means being formed of material which prevents magnetic energy from passing therethrough and reaching any objects located within said shield means and being sized to removably receive said container therewithin; and
   (D) a carrying case having a bottom compartment forming means which includes a bottom, front and rear sides and ends which cooperate to form an open-topped bottom compartment and a top compartment forming means having top front, rear and end portions which cooperate to form a top compartment, and connecting means for connecting said top compartment forming means to said bottom compartment forming means, said top and bottom compartment forming means each being sized to removably receive and securely hold a shield means and being adapted to cooperate to form a closed carrying case for said media receptacles.

2. The system defined in claim 1 wherein said holder disposable element further includes at least three additional hinges defined in said holder base between said holder base ends and at least two additional flaps, each additional flap being located between said additional hinges to be movable into a position which is substantially upright with respect to said holder base to define two side-by-side U-shaped configurations, each additional flap having additional track forming elements thereon, said additional track forming elements being located to cooperate with said track forming elements in said disposable element end flaps to form a plurality of end-to-end tracks for securely supporting magnetic media receptacles in an end-to-end orientation.

3. The system defined in claim 2 wherein said holder additional flaps and said end flaps are all essentially equal in length in the upright position with respect to said holder base.

4. The system defined in claim 1 wherein said connecting means connecting said disposable element ends to said disposable element base includes living hinges.

5. The system defined in claim 1 further including locking means for connecting said carrying case top compartment to said carrying case bottom compartment.

6. The system defined in claim 1 further including identifying indicia holding means affixed to said carrying case.

7. The system defined in claim 1 wherein said container includes a living hinge attached to each container end, and a handle attached to each living hinge.

8. The system defined in claim 7 wherein each container further includes a handle receiving means for accommodating handles of an adjacent container.

9. The system defined in claim 7 wherein said carrying case bottom compartment has a depth as measured from said bottom compartment bottom which exceeds twice the depth of a container as measured from said container bottom whereby at least two containers can be accommodated in said carrying case in a stacked configuration.

10. The system defined in claim 9 wherein said handle receiving means includes a cutout portion in each container end.

11. The system defined in claim 1 further including a handle affixed to said carrying case top compartment forming means.

12. The system defined in claim 1 wherein said holder base is free and completely unobstructed between said holder base ends and between said holder base sides.

13. The system defined in claim 7 wherein each of said container handles includes a finger holding means.

14. The system defined in claim 1 further including sealing means located between said carrying case bottom compartment and said carrying case top compartment.

15. The system defined in claim 1 further including a desiccant carrying means mounted on said carrying case.

16. The system defined in claim 1 further including supporting means on said carrying case.

17. The system defined in claim 1 wherein the longest magnetic media receptacle is sized to contain an optical disc.

18. The system defined in claim 17 wherein said media receptacles include receptacles sized to contain magnetic tape.

19. The system defined in claim 18 further including filler means on one of said disposable element end flaps.

20. The system defined in claim 1 wherein said media receptacles are shaped in the form of regular polyhedra.

21. The system defined in claim 1 wherein said container has a length as measured between said container ends which is approximately equal to but slightly greater than the length of said holder and a width as measured between said container sides which is slightly greater than the width of said holder.

22. The system defined in claim 1 wherein said shield means has a length as measured between said shield means ends which is approximately equal to but slightly greater than the length of said container and a width as measured between said shield means sides which is slightly greater than the width of said container.

23. The system defined in claim 20 wherein said regular polyhedra are bounded by rectangular surfaces.

24. The system defined in claim 1 wherein said holder hinges are living hinges.

25. The system defined in claim 1 wherein said receptacles are circular in shape.

26. The system defined in claim 14 wherein said sealing means includes a flange on said shield means.

27. The system defined in claim 26 wherein said shield means includes a further shield means in said carrying case top compartment.

28. The system defined in claim 27 wherein said further shield means is sized to removably receive said shield means located in said carrying case bottom compartment.

29. The system defined in claim 1 wherein said carrying case bottom compartment is sized to removably receive and securely hold a plurality of said containers.

30. The system defined in claim 19 further including a living hinge connecting said filler means to said one disposable element end flap.

31. The system defined in claim 1 wherein said container has a width as measured between said container sides which is approximately equal to but just slightly greater than the length of said holder and a length as measured between said container ends which is considerably greater than the width of said holder.

32. A magnetic or optical media transporting and storing system adapted to selectively receive magnetic or optical media of various sizes and shapes comprising:

(A) a container including a container bottom and container sides and ends which are attached to said container bottom to form an open-topped configuration, said container being sized to have a length as measured between said ends which is essentially equal to but slightly greater than the longest dimension of a receptacle for the largest magnetic or optical media to be accommodated in said container;

(B) a shield means having a bottom, sides and ends which cooperate to form an open-topped configuration, said shield means being formed of material which prevents magnetic energy from passing therethrough and reaching any objects located within said shield means, said shield means being sized to removably receive said container therewithin;

(C) a carrying case having a bottom compartment forming means which includes a bottom front and rear sides and ends which cooperate to form an open-topped bottom compartment and a top compartment forming means having top, front, rear and end portions which cooperate to form a top compartment, and connecting means for connecting said top compartment forming means to said bottom compartment forming means, said top and bottom compartment forming means each being sized to removably receive and securely hold a shield means and being adapted to cooperate to form a closed carrying case for said media receptacles; and (D) a holder adapted to selectively receive and securely support a multiplicity of individual media receptacles in at least one arranged row, said holder including
  (1) a monolithic disposable element which includes a base having ends and sides,
  (2) a hinge on each of said base ends,
  (3) an end flap connected to each of said hinges to be movable into a position to form a U-shape with said base,
  (4) a plurality of end flap track forming elements positioned on each of said end flaps with track defining elements in one of said end flaps cooperating with track defining elements in the other of said end flaps to define a plurality of magnetic or optical media receptacle receiving tracks for securely supporting said magnetic or optical media receptacles on said disposable element.

* * * * *